United States Patent [19]
Shiota et al.

[11] Patent Number: 5,882,609
[45] Date of Patent: Mar. 16, 1999

[54] OZONE PRODUCTION APPARATUS

[75] Inventors: Hirokazu Shiota, Tokyo; Mitsuo Terada, Takasago; Hiromi Kihara, Takasago; Yoshiyuki Nishimura, Takasago; Takashi Tanioka, Kobe, all of Japan

[73] Assignee: Kabushiki Kaisha Kobe Seiko Sho, Kobe, Japan

[21] Appl. No.: 611,787

[22] Filed: Mar. 6, 1996

[51] Int. Cl.⁶ .................................................. B01J 19/12
[52] U.S. Cl. .............................. 422/186.07; 422/186.19; 422/186.11
[58] Field of Search ................... 422/186.11, 186.19, 422/186.07

[56] References Cited

U.S. PATENT DOCUMENTS

| | | | |
|---|---|---|---|
| 3,296,116 | 1/1967 | Leviel | 204/321 |
| 3,899,685 | 8/1975 | Francis et al. | 250/536 |
| 4,461,744 | 7/1984 | Enri et al. | 422/186.18 |
| 4,606,892 | 8/1986 | Bachhoffer et al. | 422/186.2 |
| 4,690,803 | 9/1987 | Hirth | 422/186.18 |
| 5,145,350 | 9/1992 | Dawson et al. | 422/186.15 |
| 5,147,614 | 9/1992 | Conrad | 422/186.18 |
| 5,211,919 | 5/1993 | Conrad | 422/186.07 |
| 5,637,279 | 6/1997 | Besen et al. | 422/186.07 |
| 5,686,051 | 11/1997 | Shiota et al. | 422/186.14 |

FOREIGN PATENT DOCUMENTS

| | | |
|---|---|---|
| 0 253 305 | 1/1988 | European Pat. Off. . |
| 28 15 965 | 10/1979 | Germany . |
| 1-312092 | 12/1989 | Japan . |
| 3-155818 | 7/1991 | Japan . |
| 4-74281 | 11/1992 | Japan . |
| 6-41637 | 6/1994 | Japan . |
| 6-78592 | 10/1994 | Japan . |

*Primary Examiner*—Daniel J. Jenkins
*Attorney, Agent, or Firm*—Oblon, Spivak, McClelland, Maier & Neustadt, P.C.

[57] ABSTRACT

An ozone production apparatus for increasing ozone generation efficiency by improving ceramic plate cooling efficiency. An ozonizer of this invention has a steel plate shaped body for use as a discharge electrode through which gas is permeable from one surface to another. This discharge electrode is faced on both sides by two ceramic plates, with a material gas flow inlet provided on one side and an ozone flow outlet on the other side. The ozonizer unit is provided with an insulated waterproof cable for applying a high voltage to the discharge electrode. This ozonizer unit is submerged inside a cooling water tank, and a high voltage, high frequency power supply unit is connected between the discharge electrode and the cooling water, with the cooling water tank as the grounded side. In this manner, since the ozonizer unit is submerged inside the cooling water tank, the cooling efficiency is improved and the ozone generation increased.

13 Claims, 7 Drawing Sheets

OZONE PRODUCTION APPARATUS

BACKGROUND OF THE INVENTION

1. Field of the Invention

This invention relates in general to an ozone production unit and more specifically to a discharge type ozonizer for producing ozone by causing oxygen to come into contact with an electrical discharge field.

2. Description of the Related Art

The conventional discharge type ozonizer mainly employs the glass tube as a dielectric element but lately the ceramic discharge type which utilizes ceramic material as the dielectric element has spread into wide use and occupies a share of the ozonizer category. The following problems must be resolved in order to improve ozone generating efficiency in ceramic discharge type ozonizers.

In discharge type ozonizers the greater part of the electrical power applied in the discharge is converted into heat. When the temperature from this heat energy raises the temperature in the discharge section of the ozonizer, the ozone which was generated there is broken down by the heat with the resulting problem that less ozone is generated.

Figure 4:
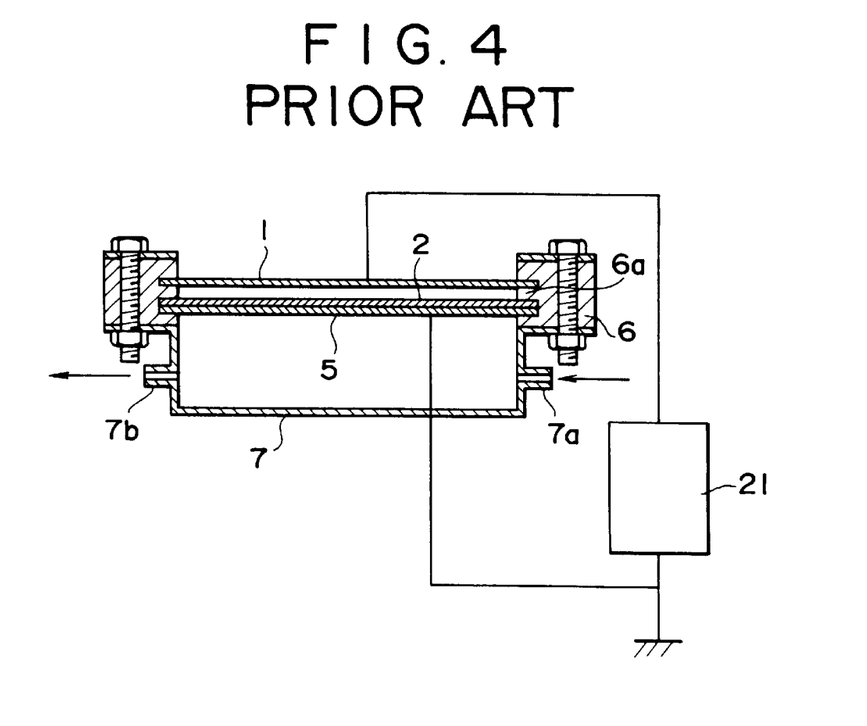
FIG. 4 is a longitudinal cross-sectional view of a conventional ozonizer.
Figure 5:
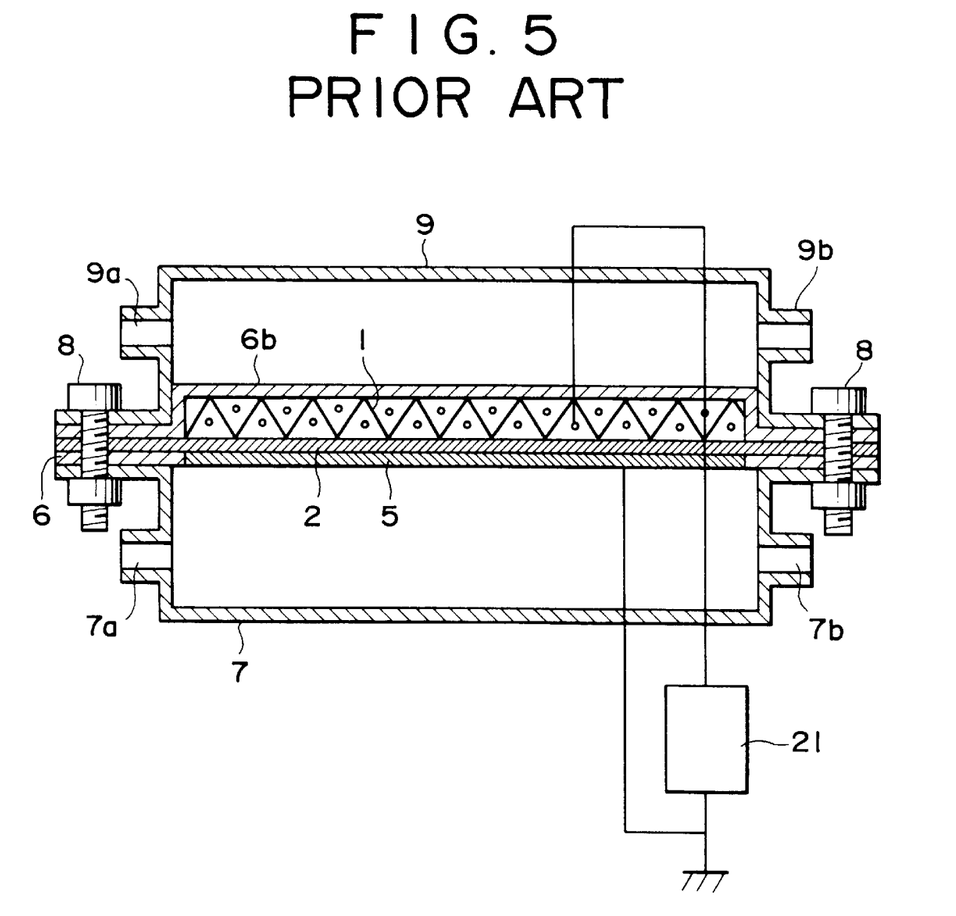
FIG. 5 is a longitudinal cross-sectional view of a conventional ozonizer.

Consequently a cooling jacket has been proposed as shown in FIG. 4 and FIG. 5 for conventional ceramic discharge ozonizers. In the example of FIG. 4, on one surface of the ceramic dielectric element 2 is placed a ground terminal 5, and a water cooling jacket 7 by way of an insulator 6 on the outer surface of the ground terminal 5. Cooling water flows into one end of the water cooling jacket 7 from the inlet 7a and flows out through the other end by way of the outlet 7b. Cooling of the ceramic dielectric element 2 is thus performed by the ground terminal 5. The discharge electrode 1 is mounted at a prescribed gap relative to the ceramic dielectric element 2 by means of the insulating spacer 6a. This discharge electrode 1 and the ground terminal 5 are connected to the high voltage power supply 21 and high voltage, high frequency power is applied between the ground terminal 5 and the discharge electrode 1 to form a discharge field in the space between the ceramic dielectric element 2 and the discharge electrode 1.

A gaseous material is made to flow through the discharge field. In the example in FIG. 5, a metal discharge electrode 1 is mounted opposite the surface of the ceramic dielectric element 2 just as in FIG. 4. However FIG. 5 differs in that a water cooling jacket 9 is mounted on the outer surface of the metal discharge electrode 1 by means of the insulating cover 6b.

Enlarging the ozonizer size is difficult because of the thin ceramic plate generally used in ceramic discharge ozonizers. Therefore, in order to obtain a specified amount of ozone, several small ozonizer units must be combined together. In the conventional cooling water jacket method, this combination of ozonizer units requires complex cooling water piping and the consequent problem of distributing equal amounts of coolant water in this complex piping system to each ozonizer unit.

Among further problems in the conventional cooling water jacket method is a phenomenon referred to as chattering that occurs within the cooling water jacket when cooling water flows a minimal distance from inlet 7a to outlet 7b causing variations in the cooling efficiency. Another problem is that when air or gas bubbles enter the cooling water, air tends to collect in the upper part of the cooling water jacket so that a localized portion is not cooled and in extreme cases may lead to damage of the ceramic plates. Also, in the cooling water jacket method the heat from the discharge section is cooled by means of the ceramic dielectric element 2 and the ground terminal 5 so there is large resistance to heat propagation and cooling efficiency is therefore poor.

Still further problems are that ceramic discharge ozonizers easily become dirty compared to glass tube discharge ozonizers, with the consequent drawback that performance drops. This problem is caused by the large surface roughness of the ceramic dielectric when compared with the glass tube discharge type.

SUMMARY OF THE INVENTION

It is therefore an object of the present invention to resolve the above mentioned defects in conventional ceramic discharge type ozonizers and improve ozone generation efficiency.

In a preferred embodiment, a preferred ozonizer of this invention comprises a steel plate shaped body utilized as a discharge electrode through which gas is permeable from one surface to another. This discharge electrode is faced on both sides by two ceramic plates with a material gas flow inlet provided on one side and an ozone flow outlet on the other side. The ozonizer unit is provided with an insulated water-proof cable for applying a high voltage to the discharge electrode. This ozonizer unit is submerged inside a cooling water tank, and a high voltage, high frequency power supply unit is connected between the discharge electrode and the cooling water, with the cooling water tank as the grounded side.

In this preferred embodiment, since the ozonizer is immersed in the cooling water tank, the outer surfaces of the two ceramic plates which have a wide surface area are always in contact with the cooling water. Therefore the heat energy generated by the discharge section of the ozonizer is transmitted to the cooling water by the two ceramic plates and efficient cooling is obtained.

Other objects and effects of the invention are made clear by the detailed explanation below.

DETAILED DESCRIPTION OF THE INVENTION

Figure 1:
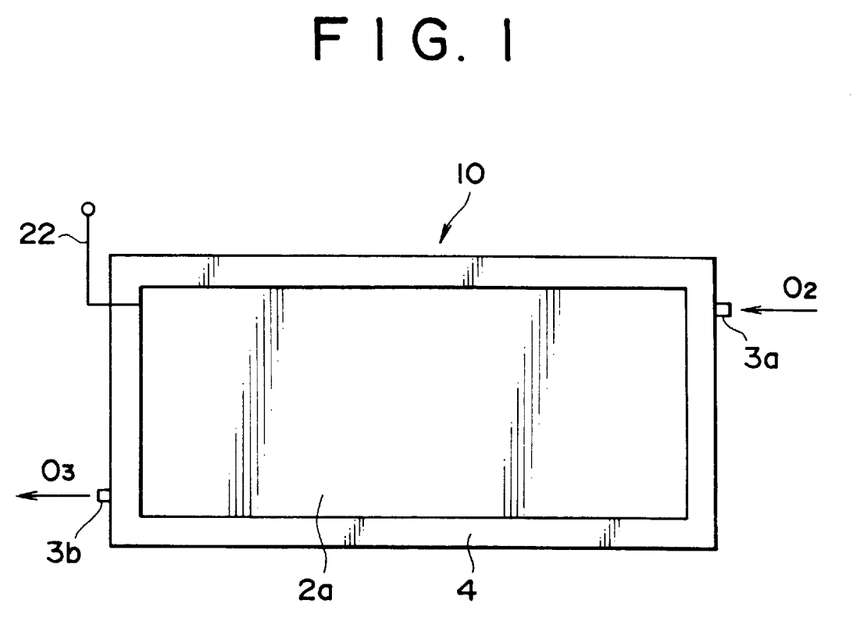
FIG. 1 is a front view of an embodiment of the ozonizer unit used in the ozonizer of the present invention.

A preferred embodiment of this invention will be described while referring to the drawings. In FIG. 1, the numeral 10 denotes an ozonizer unit which has a steel plate shaped body utilized as a discharge electrode 1 through which gas is permeable from one surface to another. The discharge electrode 1 is sandwiched on both sides by the two ceramic plates 2a and 2b. A material flow inlet 3A is provided on one side and an ozone outlet 3b is provided on the other side. An insulated water-proof cable 22 is also provided for supplying high voltage to the discharge electrode 1.

A porous metallic plate having continuous pores or a metal mesh can be utilized as the discharge electrode 1 which allows gas to permeate from one side to the other. In the embodiment shown in the figure, the metal mesh-like structure is formed by expanding a sheet metal piece with staggered slits.

A non-corrosive metal such as gold, platinum, titanium or stainless steel can be used in the discharge electrode 1 to resist the effects of the ozone that is generated. In this embodiment, a titanium plate with a thickness of 1 millimeter and an opening ratio of 50 percent of the plate was utilized. In this embodiment, a titanium plate having a maximum thickness of 3 millimeter was used.

The metal plate shaped body used as the discharge electrode 1 has numerous irregularities on the top and bottom surfaces and preferably gas is permeable from one surface to another. The previously mentioned metal plate shaped body is of this type metal having numerous irregularities on the top and bottom surfaces and in addition the discharge electrode 1 is formed with slots constituting a lattice grooves on the top and bottom surfaces, numerous protrusions on the top and bottom surfaces and is gas permeable from one surface to another.

Thus when numerous irregularities are formed at the top and bottom surfaces of the discharge electrode 1, both contacting and non-contacting portions are present in ceramic plates 2a and 2b. A dense discharge field spanning a wide area is generated near the interface of the contacting portions.

In this embodiment, fine ceramic having an alumina purity of 99 percent and a thickness of 0.7 mm (more specifically 0.635 mm) or less was used for the ceramic plates 2a and 2b.

The ceramic plates were made to a thickness of 0.7 mm or less because a significant improvement in the measured cooling efficiency occurs at 0.7 mm or less in thickness.

The ceramic plates 2a and 2b were then laid over both sides of the discharge electrode 1 and the edges covered. In this embodiment, the discharge electrode 1 and the ceramic plates 2a and 2b were covered on their edges and connected by the waterproof insulating material 4. Ozone resistant silicon rubber or PTFE packing was used as the waterproof insulating material 4. While the discharge electrode 1 and the ceramic plates 2a and 2b may be secured with screws penetrating the plates by way of ozone-resistant silicon rubber or PTFE packing used as the waterproof insulating material 4, in the example shown in the drawing, the peripheral area is sealed and secured with silicon-based plastic material.

When the edges of the discharge electrode 1 and the ceramic plates 2a and 2b are covered with the waterproof insulating material 4 as described above the peripheral areas are sealed tight. However prior to covering with the waterproof insulating material 4, the material inlet 3a is provided on one side, and the ozone outlet 3b provided on the other side. The embodiment is designed so that a gaseous material consisting of oxygen or air flows in from the material inlet 3a, travels between the ceramic plates 2a and 2b, and flows out from the ozone outlet 3b.

The waterproof cable 22 is routed inside the waterproof insulating material 4 and protectively sealed inside to supply a high voltage to the discharge electrode 1. This waterproof cable 22 is connected to the high voltage power supply 21.

Figure 3:
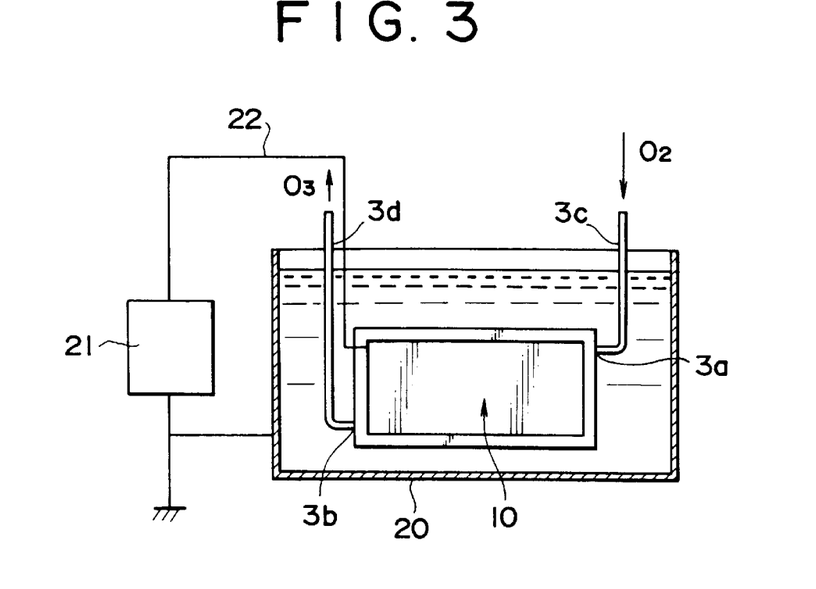
FIG. 3 is a front view partially in cross section showing one embodiment of this invention.

The ozonizer unit 10 is immersed inside the cooling water tank 20 and connected to the high voltage power supply 21 between the discharge electrode 1 and the cooling water, by using the cooling water as ground.

The cooling water tank 20 is not shown in the figure, however cooling water is made to constantly flow in from one side and out through the other. An agitating blade placed in the cooling tank functions to agitate the cooling water as needed. When the cooling water is to be circulated, a heat exchanger is installed in the circulating system to return the cooling water back to the inlet.

A high voltage, high frequency power supply between discharge electrode 1 and the cooling water with the cooling water tank as the ground, applies power to the discharge electrode 1 by means of the waterproof cable 22. The cooling water tank 20 is composed of an electrically conductive material for grounding of the cooling water side. Connecting this cooling water side to ground will prove sufficient, however in order to maintain a highly efficient ground, metallic plates (not shown) should be installed facing ceramic plates 2a and 2b at a specified distance, and a grounding wire then connected to these metallic plates.

One end of the gas material pipe 3c connects to the dispensing outlet for the gas material source (not shown) provided outside of the cooling water tank 20, while the other end connected to the gas material inlet 3a. The ozone extraction pipe 3d is run outside of cooling water tank 20 to convenient points for using the ozone.

Figure 2:
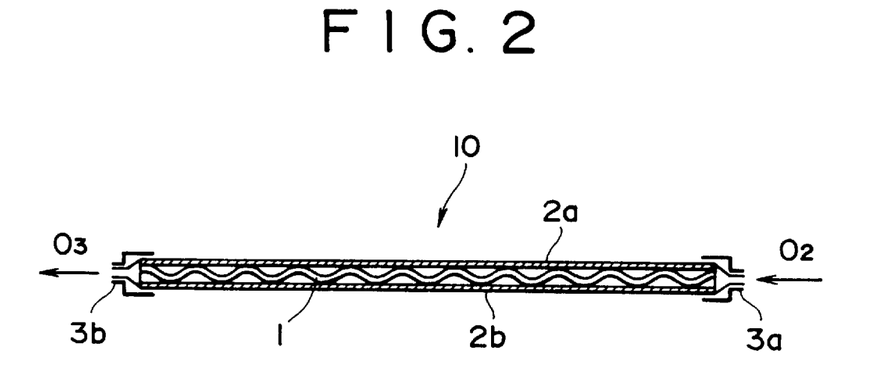
FIG. 2 is a cross-sectional view of the ozonizer unit of FIG. 1.

As a specific example, an ozonizer unit 10 having the configuration shown in FIG. 1 and FIG. 2 was fabricated with ceramic plates 2a and 2b of 100×150 mm and a discharge electrode 1 of 80×120 mm. This arrangement was immersed in the cooling water tank 20 as shown in FIG. 3. For purposes of comparison the same ceramic plates 2a and 2b and discharge electrode 1 were fabricated. As shown in FIG. 4, one side of one of the ceramic plates 2b, was fabricated having a ground terminal 5 and water cooling jacket 7 and tests then performed. The power supply was set to deliver 8 kilovolts (peak to peak) at a frequency of 5 kilohertz. Cooling water was supplied at a rate of 4 liters per minute. The gaseous material was supplied by means of a zeolite oxygen enrichment unit for air with an oxygen concentration of 90 percent and pressure of 0.5 kgf/cm$^2$. The results in Table 1 were obtained upon measuring the cooling temperature versus ozone generation (grams/hour). The cooling water collecting in the water cooling tank 20 was set at 4 liters.

TABLE 1

|  | 30° C. | 25° C. | 20° C. | 15° C. | 10° C. | 5° C. |
| --- | --- | --- | --- | --- | --- | --- |
| This invention | 18.5 | 19.3 | 21.5 | 23.0 | 25.5 | 28.1 |
| Comparison example | 11.2 | 13.8 | 15.6 | 18.2 | 19.8 | 21.0 |

In the conventional cooling water jacket method of Table 1, 15.6 grams were generated per hour, at a constant cooling water temperature of 20° C. however at 25° C. this rate fell to 13.8 grams per hour and at 30° C. fell even further to 11.2 grams per hour for a drastic drop in ozone generation. In the method of this invention however, 18.5 grams of ozone were generated at 30° C. proving that a highly efficient cooling had been obtained.

In these measurement results, it was verified that the ozone generation efficiency did not decline, even if the cooling water temperature exceeded 30° C. When the circulation of cooling water was stopped and operation was continued, the cooling water temperature versus ozone generation amount over elapsed time measured with the above test setup, is shown in the table below.

TABLE 2

|  | 0 minutes | 30 minutes | 60 minutes | 90 minutes |
|---|---|---|---|---|
| Cooling water temperature | 30° C. | 37° C. | 42° C | 45° C. |
| Ozone amount | 18.5 | 17.8 | 17.3 | 16.8 |

Results in Table 2 show that the amount of ozone generated does not drop significantly even when the cooling water temperature increases. This is partly due to the cooling efficiency of the discharge section but the principal reason is that heat from the discharge section is quickly dissipated by the cooling water.

In other words, there is no real significant breakdown of ozone at temperatures of 40° to 50° C. but ozone breakdown does probably occur from extended static high temperatures generated from the discharge. In this invention the discharge electrode made from metal has fine thermal conductivity in the center. The ceramic plates 2a and 2b have relatively poor thermal conductivity but do have portions making contact with the discharge electrode 1. A direct heat exchange with the cooling water by way of discharge electrode 1 and ceramic plates 2a and 2b is performed due to the cooling water making contact with the wide and thin outer surface. In particular, when the thickness of the ceramic plates 2a and 2b is made less than 0.7 mm, a greater improvement in the heat propagation characteristic is obtained due to improved heat propagation by the ceramic plates 2a and 2b, and by surface contact with the discharge electrode 1. So a ceramic plate thickness of less than 0.7 mm leads to a large improvement in cooling efficiency.

The metal discharge electrode 1 is preferably also formed of anti-corrosive metal and subjected to surface passivation treatment. These serve to reduce contamination on the surface of the dielectric element and reduce possible deterioration in performance.

In the following detailed description, experiments were performed in a concentrated discharge—oxygen atmosphere with combinations of ceramic plates 2a and 2b and various metals. Discharge experiments were first performed with chemically stable precious metals such as gold and platinum in the discharge electrode and observations then made for metal adhering to the ceramic surface. The platinum electrode showed the worst results with large amounts of metal adhering to the ceramic surface. Similarly, large amounts of gold were also found to be adhering.

Among the various metals, stainless steel, in particular discharge electrodes made of SUS316-L and titanium were verified as having less particles adhering to the ceramic surface than discharge electrodes made from precious metals. A feature shared by SUS316-L and titanium was the formation of a strong oxidation film in an oxygen atmosphere which served to prevent oxidation beyond a certain level. Further comparisons of these two metals revealed that titanium was superior in inhibiting any more than a fixed amount of particle adherence, even after long term operation.

After a long period of operation, the surface of the titanium electrode became black, and further observation with an electron surface microscope showed that a thin oxide film was generated by this blackened portion and that this film did not obstruct generation of ozone by the discharge electrode. Titanium also showed particularly strong corrosion resistance to oxidation with this corrosion resistance resulting from formation of a passivation layer on the surface of the titanium.

Whereupon the inventors tried covering the surface of a titanium discharge electrode 1 from the start with an oxidized film. The surface of the titanium discharge electrode was oxidized and formed with a passivation layer particularly by use of an electrochemical anode oxidization method. The resulting electrode was found to have no contamination on the surfaces of the ceramic plates 2a and 2b even under a strong and intense discharge field.

Figure 6:
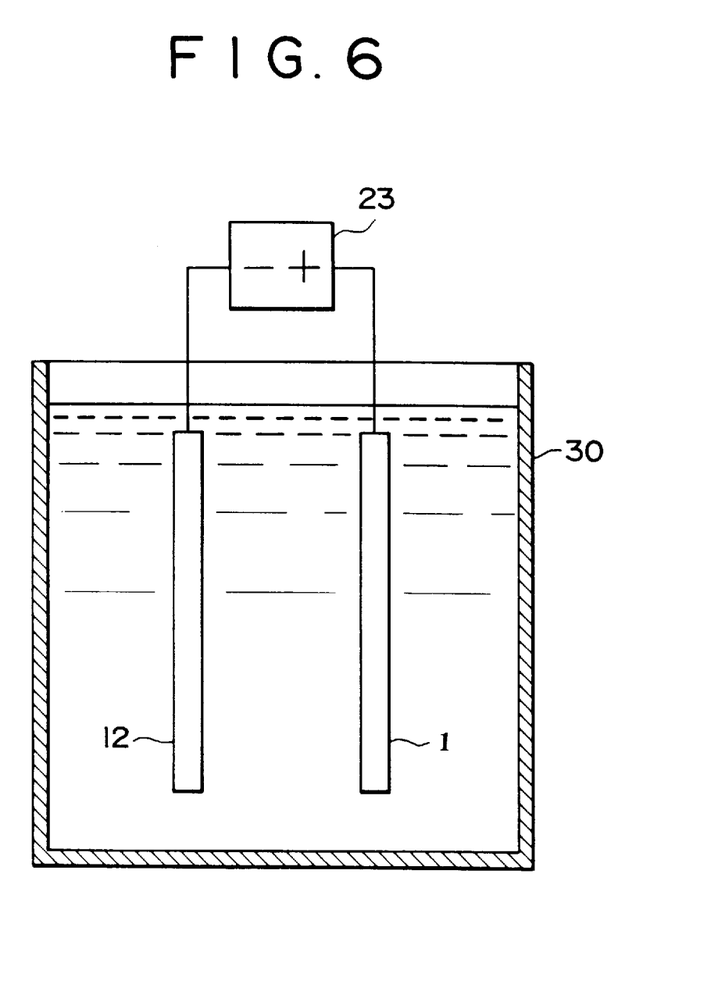
FIG. 6 is a cross-sectional view of a typical of equipment for machining the electrode for ozonizer.

The passivation layer obtained by this anode oxidation layer was placed in electrolytic fluid in an electrolytic tank 30 as shown in FIG. 6. The metal discharge electrode 1 was placed on the anode side and the titanium plate 12 on the cathode side, suspended to face each other and connected to the direct current power supply 23. This kind of electrochemical anode oxidization method was sufficient for the aluminum passivation layer on the surface and some additives with electrolytic properties such as phosphoric acid were added to the water as electrolytic fluids.

Specifically, the anode oxidization method involved filling a four liter electrolytic tank 30 full with 0.1% phosphor salt solution and submersing the discharge electrode 1 having a grating with 100 mm slots in the anode and arranging cathodes 12 with the same dimensions as the titanium plate, in parallel at 50 mm intervals. When 100 volts was applied from a DC power supply 22, hydrogen bubbles were actively emitted from the cathode 12 and at the same time fine oxygen bubbles were found to be emitted while a rapid discoloration occurred on the surface of the metal discharge electrode. When the power was first applied a current of 1.5 amperes flowed but after approximately 30 seconds this current dropped to 1 ampere and the metal discharge electrode 1 was covered with a black oxidized layer. Since no further changes were found, the application of power was stopped with anode oxidation being complete. The metal discharge electrode 1 was extracted and was dried after washing.

The surface oxidation method for the titanium metal discharge electrode 1 can be performed with a variety of methods other than the anode oxidation method listed above. However in the method for generating an oxidized layer on the surface by heating the titanium, the objective of reducing the contamination adhering to the ceramic plates 2a and 2b from an unprocessed discharge electrode 1 is at least attained, however unlike the above anode oxidation method, this failed to provide complete protection from contamination adhering to the plates. The anode oxidation method proved superior because the electrochemical processing formed a uniform layer and also because of the molecular attraction of the oxides and base titanium in the layer. Restated, this inter-layer attraction provides more than ample strength to resist the discharge. Further, this oxidized layer is extremely thin and tough, not harmful to the discharge and serves to prevent an outflow of ions from the metal.

The surface can be oxidized with an oxidizing agent however in the liquid phase of the oxidizing material, the resulting oxidized surface layer lacks sufficient strength and is not feasible for practical use. Forming a layer by utilizing the gaseous phase of the oxidizing agent required over 10 hours in contact with the ozone. Also, most of the ozone for the chemical reaction could not be used and had to be thrown away making this method impractical from the viewpoint of cost even though the prescribed object of the invention was at least achieved.

The metal discharge electrode need not be restricted to titanium as long the surface has an oxidized layer and passivation layer. For instance an oxidized layer may also of course be formed on corrosion resistant metals such as zirconia, pure titanium or titanium alloy. Compared to the conventional art these metals prove effective in inhibiting contamination of the ceramic plate surfaces.

Next the water cooled ceramic ozonizer shown in FIG. 5 was used. The previously mentioned metallic discharge electrode of 100 mm square was used and an 8 kilovolt pulse voltage applied at 5 kilocycles between the metal discharge electrode 1 and the ground terminal 5. Four liters of oxygen per minute were made to flow between the metal discharge electrode 1 and the ceramic plates 2a and 2b. The ozone generation amounts in the following Table 3 were obtained upon comparing the discharge electrode 1 of this invention with an unprocessed discharge electrode of titanium grating plate having the same dimensions under continuous operating conditions. The figures in Table 3 are in units showing grams of ozone generated per hour.

TABLE 3

|  | Start time | After 1 Hr. | After 10 Hrs. | After 100 Hrs. | Contamination |
|---|---|---|---|---|---|
| Anode oxidized electrode |  | 15.1 | 15.0 | 15.0 | No contamination |
| Unprocessed electrode | 15.0 | 14.2 | 13.8 | 13.8 | Spot type Contamination |

The above results clearly show that in the method of this invention, there was no contamination over elapsed time from the discharge electrode on the ceramic plates 2a and 2b and that the amount of ozone generation did not decrease.

Injecting the metal or metal oxide in the discharge surface of ceramic plates 2a and 2b previous to assembling the ozonizer unit proves effective in maintaining generation of ozone over a long period. Ion injection of metal or metal oxides beforehand in the ceramic plates 2a and 2b makes it possible to maintain the generation of ozone over long periods without changing the ceramic plate surface conditions, even if there is an ion shift from the metal discharge electrode to the ceramic plates 2a and 2b. Metallic ions such as titanium, manganese, palladium and platinum can be injected, but preferably metal ions identical to the metal of the discharge electrode 1 should be injected. Materials such as 96% $Al_2O_3$, $ZrO_2$ can be utilized as ceramic plate materials.

Ion injection of other metal or metal oxide except aluminum is in particular preferred when $Al_2O_3$ is used for the ceramic plate. $Al_2O_3$ which functions as a catalyst to break down ozone is formed in the ceramic surface when ions are injected.

Also preferable is that the amount of metallic ions injected into the discharge surface be $1 \times 10^{17}/cm^2$ less. When larger than this amount the surface resistance of the ceramic plate declines to a few megohms so that a satisfactory uniform discharge field for the ceramic plate surface cannot be obtained. For instance when the dose of an amount was set at $1.5 \times 10^{17}/cm^2$ the surface resistance of the ceramic plate declined to about 10 megohms, so a satisfactory discharge field could not be obtained. However a dose below $1 \times 10^{17}/cm^2$ would provide a surface resistance of 20 megohms or more and form a satisfactory discharge field. These figures (quantity/$cm^2$) are values for the center of the target piece with the surface resistance value referring to the resistance in a 1 centimeter space near the center of the target piece.

The conventionally known equipment for ion injection can be utilized for ion injection. Further, the ceramic surface layer can be formed using methods such as AIP and CVD and the same results as above obtained. Also preferable is that the surface resistivity is $1 \times 10^5$ or more so that satisfactory discharge field can be obtained.

Figure 7:
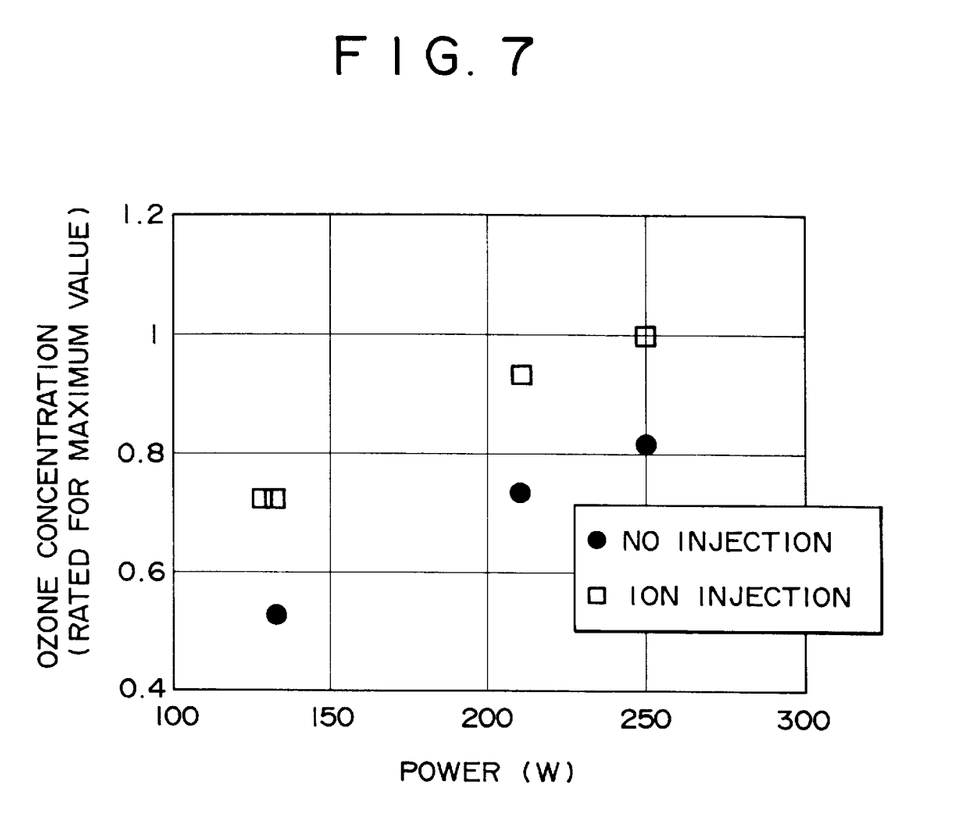
FIG. 7 is a graph showing ozone concentration versus power consumption.

In a specific example, a ceramic plate of 96% alumina (100×150 mm) titanium ions were injected in amounts of $1 \times 10^{17}/cm^2$ at an acceleration voltage of 70 kilovolts and energy of 140 keV, and a titanium discharge electrode 1 made of titanium was used. An unprocessed ceramic plate (100×150 mm) of 96% alumina was used as the comparison example. The power supply was set to deliver 6 kilovolts (peak to peak) at a frequency of 5 kilohertz. Cooling water was supplied at a rate of 4 liters per minute. The gaseous material was supplied by means of a zeolite oxygen enrichment unit for air with an oxygen concentration of about 90 percent. Upon measuring the ozone generation (grams/hour), at 200 watts, the ozone was found to be generated in amounts of 90 g/$m^3$ and retained the same concentration even after 50 hours. FIG. 7 shows the results in terms of ozone generation amounts versus power consumption. As these results clearly show, the use of the ion-injected ceramic plate reduces variations in ozone amounts generated over time and improves the ozone concentration by approximately 20 percent. The reason for the improved ozone concentration is that injection of titanium ions served to inhibit action of $Al_2O_3$ which functions as a catalyst to breakdown the ozone.

A multiple unit ozonizer which is a combination of a plurality of ozonizer units of this invention will next be explained by referring to an embodiment in FIGS. 8 and 9.

Generally when utilizing flat ceramic plates in the dielectric element, restrictions on maximum size must be made on account of needs for mechanical strength in the ceramic plate and dimensional accuracy. Currently, a ceramic plate up to about 200 mm square and having a thickness of around 1 mm can be easily manufactured. However when this size is exceeded, manufacture of a ceramic plate with satisfactory dimensional accuracy proves difficult. Even if a ceramic plate with satisfactory dimensional accuracy could be produced, the plate would deform easily under pressure and could not maintain its dimensional accuracy. Therefore, in order to obtain the specified ozone generation capacity, multiple ozonizers of this invention must be connected as a multiple unit ozonizer.

Figure 8:
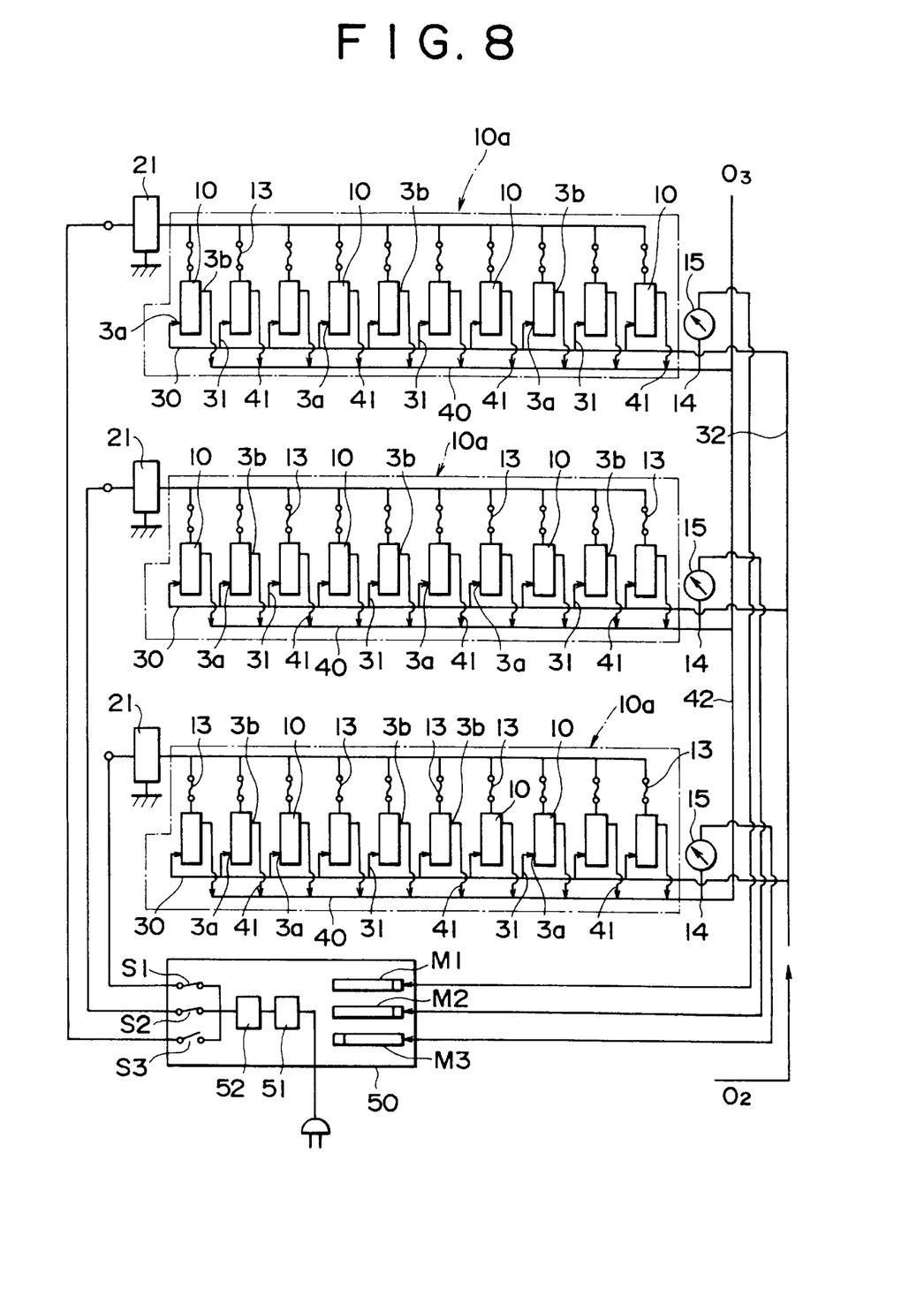
FIG. 8 is a front view of a multiple unit ozonizer as an embodiment of this invention.
Figure 9:
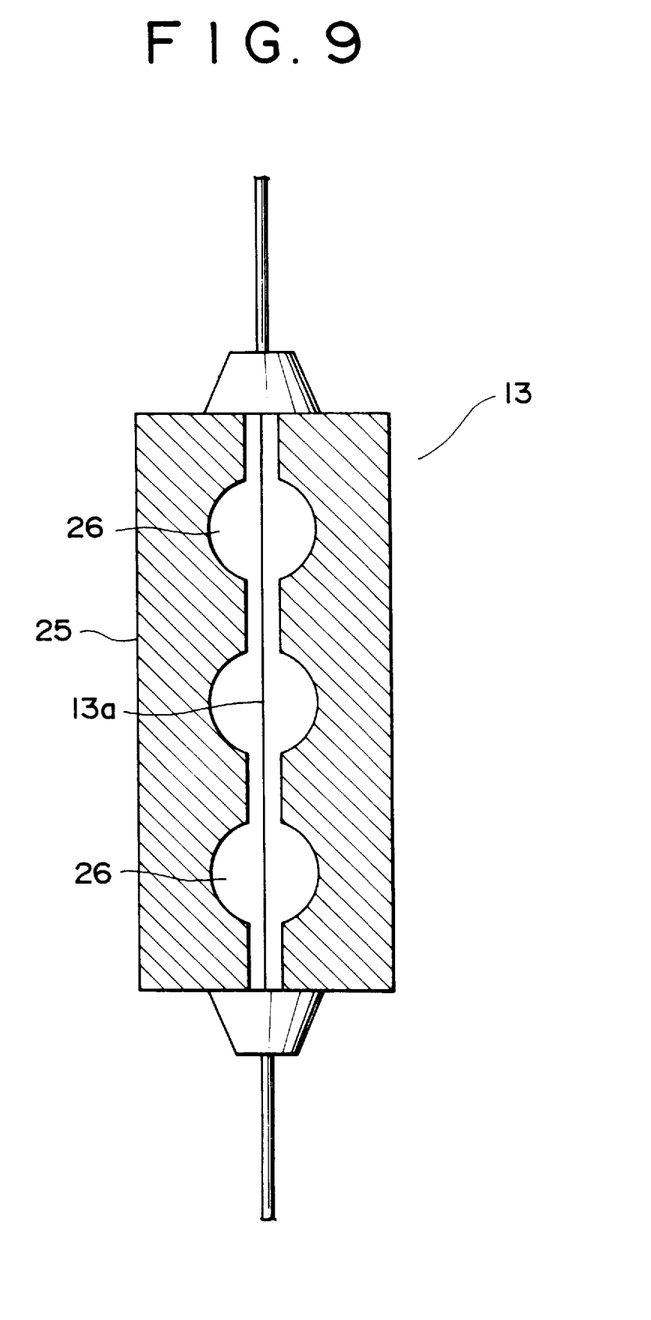
FIG. 9 is a cross-sectional view of the fuse used in the multiple unit ozonizer of FIG. 8.

Reference numeral 10 in FIG. 8 denotes the ozonizer unit. In this embodiment, a fixed amount was established for 1 set of said ozonizers. The ozonizer block 10a in the figure consists of each ozonizer unit 10 or a quantity of ozonizer unit 10 connected in parallel by way of circuit breakers or fuses to one high voltage power supply unit 21. In this embodiment, since ceramic plates of 100×150 mm in size were used to provide approximately 20 grams per hour of ozone, ten of these plates were placed in parallel to configure an ozonizer block providing 200 grams of ozone per hour.

The conventionally known technology may be used for the high voltage power supply 21 with a circuit configuration for conversion to a high voltage high frequency pulse power supply. The output end of this high voltage power supply 21 is electrically connected to the ozonizer units 10 and supplies a high voltage between the discharge electrode and the ground terminal. In this invention, a circuit breaker 13 such as a fuse or breaker is installed for each ozonizer unit 10 and each ozonizer unit 10 is connected in parallel with the high voltage power supply 21. Therefore, if the dielectric element is damaged or short circuits, the power will be cut off to the affected ozonizer unit 10, even though power is still being supplied to the other ozonizer units 10 in the ozonizer block 10a.

As a general rule, a circuit breaker 13 is installed for each ozonizer unit 10, however one circuit breaker 13 can be installed for a number of ozonizer units. When a circuit breaker 13 is installed for a number of ozonizer units, the triggering of circuit breaker 13 also shuts off correctly functioning ozonizer units so such a setup is not desirable unless adequate ozonizer capacity can be ensured.

A fuse is normally utilized as the circuit breaker 13 however devices such as breakers which automatically shut off power when a specified current is exceeded can also be used. However since circuit breakers 13 handles high voltage it is important that there be ample gap between the contact points in the circuit path in a resettable breaker.

When the high voltage fuse 13a melts, the fuse metal scatters and adheres in the vicinity. This scattering metal may harm the electrical insulation so preferably this fuse 13a is placed inside a container. Electrical opens or shorts may occurs due to metal adhering, even when inside the container so providing a container 25 such as shown in FIG. 9 is preferred, having within it, a number of enlargements 26.

The gas material flow paths and ozone flow paths of each ozonizer 10 are connected in parallel. The gas branch pipe 31 branches off from the block gas flow line 11 at a specified number of points. The end of each gas branch pipe 31 connects with the gas material inlet 3a of each ozonizer unit 10. The ozone outlet 3b of each ozone unit 10 connect to block collective flow path 40 by means of respective collective branch pipes 41, all connected to comprise the ozonizer block 10a.

A plurality of the ozonizer blocks 10a are combined together and a concentration meter 15 is provided at the collective ozone outlet 14 of each ozonizer block.

While the example in FIG. 8 shows three sets of the ozonizer block 10a, the number of ozonizer blocks can be selected as needed. The amount of ozone required for industrial use is generally 1 to 2 kilograms per hour so that a combination of 5 to 10 ozonizer blocks 10a each supplying 200 grams per hour would provide a sufficient total amount of ozone.

Combining the ozonizer blocks 10a, involves preparing a sufficient number of each of the separately manufactured ozonizer blocks 10a. The blocks can each be connected with their own commercial high voltage power supply 21, or as shown in FIG. 8, each block is connected to the output terminal of the power supply control circuit on the control panel 50. In the example in the figure, each of the block material gas lines 30 is connected on one end to a gas material supply source not shown in the figure (oxygen tank, pressure fluctuation zeolite oxygen enrichment unit, air pressure feed equipment such as blowers) by means of gas material feed pipe 32.

While the block collective flow path 40 is connected in the drawing to the ozone supply pipe 42, the gas material feed pipe 32 and the ozone supply pipe 42 may be installed for each ozonizer block 10a.

Solenoids, manually operated valves and pipes may be installed at convenient locations in the gas pipe lines including the above mentioned gas material feed pipe 32 and the ozone supply pipe 42 in order to shut off one end of the line as needed.

The ozone outlet 14 is located at points downstream of block collective flow path 40 and the concentration meter 15 is provided to monitor the ozone concentration (density) within this segment of the pipeline. A high measurement accuracy is not required of the concentration meter 15 but variations in ozone concentration within a few percent should appear on this meter. The concentration meter 15 can be of simple conventionally known types, for instance, this meter 15 could comprise a pair of electrodes stored in electrolytic fluid separated by ozone permeation layers, and the energy or change in induction occurring across the pair of electrodes due to the amount of ozone dissolving in the electrolytic fluid then measured. This meter 15 might also comprise a fixed electrolytic layer having one surface with an opening of a specified percent to allow contact with catalyst metal and the ozone concentration (or density) then measured by finding the amount of energy occurring between the electrodes of the catalyst metal and rear surface due to ozone dissolving at the boundary field between the fixed electrolytic layer and the catalyst metal.

Preferably the value measured by the concentration meter 15 is sent to the control panel 50 where monitoring and control of the process is performed.

A concentration meter 15 is provided at the collective ozonizer outlet 14 for each ozonizer block 10a where each ozonizer block comprises multiple sets including spare units, and when the ozone concentration as measured at the ozone concentration meter falls below a predetermined value, this drop in ozone density is detected and operation of the affected ozonizer block 10a brought to a stop with operation resuming by operating the spare ozonizer block 10a.

In other words, in the example in the drawing, two sets of ozonizer blocks 10a have sufficient ozone production capacity, with one spare ozonizer block 10a kept in reserve. This spare ozonizer block 10a is not used in normal operation but kept instead on standby. During operation when a malfunction in an ozonizer block 10a occurs and ozonizer production capacity falls below a set level, the malfunctioning ozonizer block 10a is shut down and operation switched over to the spare ozonizer block 10a. Switching over to the spare ozonizer block 10a can be performed manually with switches S1, S2 and S3 while observing monitors M1, M2 and M3 on the control panel or switching can be performed automatically by internal control circuits not shown in the figure, in the control panel 50.

Inspection and repairs can be made on the malfunctioning ozonizer block 10a which was shut down. The pipes for instance for gas flow to each ozonizer block preferably can be made detachable by valves or other means to allow easy removal from the pipe system in order to make safety and maintenance checks to verify no adverse effects (for example a gas line that is stuck open) on other ozonizer blocks 10a.

The high voltage power supply 21 normally comprises a primary side rectifier, pulse generator and step-up transformer. This however would prove expensive if installed for each ozonizer block 10a. Therefore as shown in the drawing, the primary rectifier 51 and pulse generator are both mounted on one chassis and stored in the control panel 50 so that the high voltage power supply 21 located in the ozonizer block 10a comprises only the step-up transformer. In this arrangement provision of the above mentioned switches S1, S2 and S3 in the low voltage pulse generator circuit allows easy switch-over to the spare ozonizer block 10a.

What is claimed is:

1. An ozone production apparatus comprising:
    an ozonizer unit which comprises,
        a discharge electrode said electrode being a steel plate shaped body in which gas is permeable from one surface to another,
        two ceramic dielectric elements facing said discharge electrode on the front and back sides thereof,
        a water-proof insulating material for covering the edges of said discharge electrode and said ceramic plates, and
        an insulated water-proof cable for applying high voltage to said discharge electrode;
    a cooling water tank for submerging said ozonizer unit;
    and a high voltage, high frequency power supply unit connected between said discharge electrode and said cooling water, with said cooling water tank as the grounded side and functioning to supply high voltage, high frequency power.

2. An ozone production apparatus of claim 1 wherein, the discharge electrode has numerous irregularities on the front and back surfaces thereof.

3. An ozone production apparatus of claim 1 wherein, the discharge electrode is made of corrosion resistant material and surface of said corrosion resistant material is subjected to a passivation process.

4. An ozone production apparatus of claim 2 wherein, the discharge electrode is made of titanium.

5. An ozone production apparatus of claim 3 wherein, the passivation treatment is performed by anode oxidation.

6. An ozone production apparatus comprising:
    a ceramic plate;
    a grounding terminal attached to the rear surface of said ceramic plate; and
    a metal discharge electrode installed to face the front surface of said ceramic plate, said metal discharge electrode is made of corrosion-resistant metal and subjected to surface passivation treatment, a discharge field is formed between said metal discharge electrode and said ceramic plate and ozone is produced from the oxygen.

7. An ozone production apparatus of claim 6 wherein, the passivation treatment is performed by anode oxidization.

8. An ozone production apparatus comprising:
    an ozonizer unit having a discharge electrode in a container, and one end of said container provided with a material flow inlet, and the other end with an ozone flow outlet;
    an ozonizer block comprising a specified number of ozonizer units, each ozonizer unit or set of ozonizer units being connected in parallel with a high voltage power supply unit by means of circuit breakers, these ozonizer blocks are provided with a collective ozone outlet for the collected ozone flowing out from the outlet of each ozonizer unit; and
    said ozonizer blocks are arranged in multiple units wherein, the ceramic plate is injected on its discharge surface with metal or metal oxide ions of $1\times10^{17}$ pcs/cm$^2$ or less.

9. An ozone production apparatus of claim 6 wherein, said circuit breakers is a fuse stored in a container with at least one portion having an enlarged diameter.

10. An ozone production apparatus of claim 1 wherein, metal or metal oxide ions are evaporation-deposited on the discharge surface of said ceramic plate and formed into a layer having a surface resistivity of $1\times10^5$ or more near the center of said ceramic plate.

11. An ozone production apparatus of claim 8 wherein, said metal injected into the ceramic plate is titanium.

12. An ozone production apparatus comprising:
    a ceramic plate which is injected on its discharge surface with metal or metal oxide ions of $1\times10^{17}$ pcs/cm$^2$ or less;
    a grounding terminal attached to the rear surface of said ceramic plate; and
    a metal discharge electrode installed to face the front surface of said ceramic plate, a discharge field is formed between said metal discharge electrode and said ceramic plate, and ozone is produced from the oxygen.

13. An ozone production apparatus comprising:
    a ceramic plate, metal or metal oxide ions are evaporation-deposited on a discharge surface of said ceramic plate and formed into a layer having a surface resistivity of $1\times10^5$ or more near the center of said ceramic plate;
    a grounding terminal attached to the rear surface of said ceramic plate; and
    a metal discharge electrode installed to face the front surface of said ceramic plate, a discharge field is formed between said metal discharge electrode and said ceramic plate, and ozone is produced from the oxygen.

* * * * *